United States Patent
Asanuma

(10) Patent No.: US 10,995,686 B2
(45) Date of Patent: May 4, 2021

(54) EVAPORATED FUEL TREATMENT DEVICE

(71) Applicant: AISAN KOGYO KABUSHIKI KAISHA, Obu (JP)

(72) Inventor: Daisaku Asanuma, Gamagori (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 16/489,077

(22) PCT Filed: Dec. 19, 2017

(86) PCT No.: PCT/JP2017/045501
§ 371 (c)(1),
(2) Date: Aug. 27, 2019

(87) PCT Pub. No.: WO2018/159074
PCT Pub. Date: Sep. 7, 2018

(65) Prior Publication Data
US 2020/0063670 A1    Feb. 27, 2020

(30) Foreign Application Priority Data

Feb. 28, 2017 (JP) .............................. JP2017-037241

(51) Int. Cl.
*F02D 41/00* (2006.01)
*B60K 15/03* (2006.01)
(Continued)

(52) U.S. Cl.
CPC ............ *F02D 41/003* (2013.01); *B60K 15/03* (2013.01); *F02D 41/08* (2013.01); *F02D 41/12* (2013.01);
(Continued)

(58) Field of Classification Search
CPC ........ F02D 41/00; F02D 41/003; F02D 41/08; F02D 41/12; F02M 25/0836;
(Continued)

(56) References Cited

U.S. PATENT DOCUMENTS 5,758,628 A    6/1998  Wada
6,014,958 A    1/2000  Miwa et al.
(Continued)

FOREIGN PATENT DOCUMENTS

JP    H7-119557 A      5/1995
JP    H9-296753 A     11/1997
(Continued)

OTHER PUBLICATIONS

Written Opinion (English Translation) for PCT/JP2017/045501 dated Mar. 27, 2018 (11 pages).
(Continued)

*Primary Examiner* — Hieu T Vo
(74) *Attorney, Agent, or Firm* — Shumaker, Loop & Kendrick, LLP

(57) ABSTRACT

An evaporated fuel processing device that includes a pump configured to supply purge gas, which includes evaporated fuel in a fuel tank, to an intake passage of an engine through a purge passage; a controller configured to control the pump; and a detecting unit configured to acquire a gas amount introduced to the intake passage while the pump is being driven in a stable state where an air amount introduced from open air to the intake passage is stable, and configured to detect, by using change in the acquired gas amount, a state where the purge gas is unable to be normally supplied from the purge passage to the intake passage.

5 Claims, 9 Drawing Sheets

(51) Int. Cl.
*F02D 41/08* (2006.01)
*F02D 41/12* (2006.01)
*F02M 25/08* (2006.01)
*F02M 35/10* (2006.01)

(52) U.S. Cl.
CPC .. *F02M 25/0836* (2013.01); *F02M 35/10222* (2013.01); *F02M 35/10373* (2013.01); *B60K 2015/03243* (2013.01); *F02M 25/0854* (2013.01)

(58) Field of Classification Search
CPC .......... F02M 35/0373; F02M 25/0854; B60K 15/03; B60K 2015/03243
See application file for complete search history.

(56) References Cited

U.S. PATENT DOCUMENTS

| | | | |
|---|---|---|---|
| 6,161,423 | A | 12/2000 | Okuma |
| 6,679,111 | B2 | 1/2004 | Shigihama et al. |
| 7,941,280 | B2 | 5/2011 | Wild |
| 10,760,533 | B2* | 9/2020 | Nakagawa ......... F02M 25/0818 |
| 2020/0116091 | A1* | 4/2020 | Asanuma ............... F02D 41/004 |
| 2020/0141361 | A1* | 5/2020 | Nakagawa ......... F02M 25/0836 |

FOREIGN PATENT DOCUMENTS

| | | |
|---|---|---|
| JP | H10-089162 A | 4/1998 |
| JP | H11-030158 A | 2/1999 |
| JP | H11-270418 A | 10/1999 |
| JP | H11-343925 A | 12/1999 |
| JP | 2002-349357 A | 12/2002 |
| JP | 2002-364463 A | 12/2002 |
| JP | 2007-278094 A | 10/2007 |
| JP | 2009-228669 A | 10/2009 |

OTHER PUBLICATIONS

International Search Report (ISR) (English translation) for PCT/JP2017/045501 dated Mar. 27, 2018 (2 pages).

* cited by examiner (First Embodiment)

(Second Embodiment)

EVAPORATED FUEL TREATMENT DEVICE

TECHNICAL FIELD

The disclosure herein relates to an evaporated fuel processing device mounted on a vehicle.

BACKGROUND ART

Japanese Patent Application Publication No. 2002-349357 describes an abnormality determination device for an exhaust gas recirculation system (hereinbelow termed "EGR system") of an automobile. The EGR system is provided with an EGR pipe communicating an exhaust passage and an intake passage of an engine, and an EGR valve arranged at an intermediate position of the EGR pipe. In the EGR system, damage on the EGR pipe and disconnection of the EGR pipe are diagnosed by using a difference between a pressure in the intake pipe with the EGR valve open and a pressure in the intake pipe with the EGR valve closed while the engine is being driven.

SUMMARY

Technical Problem

In the aforementioned technique, gas is supplied to the intake passage by using a pressure difference between the exhaust passage and the intake passage. Due to this, the gas cannot be supplied stably unless the pressure difference between the exhaust passage and the intake passage is large enough to a certain degree.

A vehicle such as an automobile may be provided with an evaporated fuel processing device for supplying evaporated fuel generated in a fuel tank to an intake passage. The evaporated fuel processing device supplies purge gas containing the evaporated gas to the intake passage by using a pressure difference between the intake passage and the evaporated fuel processing device. Due to this, the purge gas cannot be supplied sufficiently to the intake passage unless the pressure difference between the intake passage and the evaporated fuel processing device is large enough to a certain degree. As a result, there may be a case in which a state where the purge gas cannot be supplied normally from a purge passage to the intake passage cannot be detected by using the purge gas supplied to the intake passage.

The disclosure herein provides a technique that is capable of suitably supplying purge gas upon detecting a state where the purge gas cannot be supplied normally from a purge passage to an intake passage.

Solution to Technical Problem

A technique disclosed herein may be an evaporated fuel processing device that comprises a pump configured to supply purge gas, which includes evaporated fuel in a fuel tank, to an intake passage of an engine through a purge passage; a controller configured to control the pump; and a detecting unit configured to acquire a gas amount introduced to the intake passage while the pump is being driven in a stable state where an air amount introduced from open air to the intake passage is stable, and configured to detect, by using change in the acquired gas amount, a state where the purge gas is unable to be normally supplied from the purge passage to the intake passage.

According to this configuration, the purge gas can be pumped by the pump when the gas amount is acquired. As a result, the purge gas is suitably supplied to the intake passage in a state where the purge gas can be supplied normally from the purge passage to the intake passage. On the other hand, in the state where the purge gas cannot be supplied normally from the purge passage to the intake passage, the purge gas is not suitably introduced to the intake passage even when the purge gas is pressurized by the pump. Due to this, an amount of the purge gas supplied to the intake passage differs greatly between the state where the purge gas can be supplied normally from the purge passage to the intake passage and the state where the purge gas cannot be supplied normally from the purge passage to the intake passage. As a result, the gas amount introduced to the intake passage can be changed significantly between the state where the purge gas can be supplied normally from the purge passage to the intake passage and the state where the purge gas cannot be supplied normally from the purge passage to the intake passage. Due to this, the state where the purge gas cannot be supplied normally from the purge passage to the intake passage can be detected by using the gas amount introduced to the intake passage.

In a case where a change state where the air amount introduced to the intake passage greatly changes occurs while acquisition of the gas amount is executed, the detecting unit may prohibit the acquisition of the gas amount until a predetermined period elapses from the change state. Immediately after when the change state has occurred, the air amount introduced from open air to the intake passage may not be stable. According to this configuration, the acquisition of the gas amount used in detection can be prohibited in the situation where the air amount introduced from open air to the intake passage is not stable.

The detecting unit may prohibit acquisition of the gas amount in a case where a concentration of the evaporated fuel of the purge gas is equal to or higher than a reference concentration. In acquiring the gas amount, the purge gas is supplied to the intake passage. By prohibiting the acquisition of the gas amount in the case where the concentration of the evaporated fuel of the purge gas is equal to or higher than the reference concentration, a fluctuation in an air-fuel ratio and discharge of the purge gas into open air can be suppressed.

The stable state may include at least one state of a state where the engine is stopped, an idling state, and a decelerating state.

The detecting unit may stop acquisition of the gas amount in a case where a duration of the acquisition of the gas amount exceeds a predetermined period. According to this configuration, the purge gas can be suppressed from being supplied to the intake passage over a long period of time for the purpose of the acquisition of the gas amount.

The evaporated fuel processing device may further comprise: a control valve configured to switch between a state of opening the purge passage and a state of closing the purge passage. The control valve may be maintained in the state of opening the purge passage while the gas amount is acquired, and the control valve may switch from the state of opening the purge passage to the state of closing the purge passage in a case where the duration of the acquisition of the gas amount exceeds the predetermined period. According to this configuration, in a case where the acquisition of the gas amount is stopped, supply of the purge gas to the intake passage can be prevented by the control valve.

A control method and a computer program for realizing the aforementioned communication device, and a computer-readable recording medium storing the computer program are also novel and useful. Further, a communication system provided with the aforementioned communication device and an external device are also novel and useful.

DETAILED DESCRIPTION

First Embodiment

Figure 1:
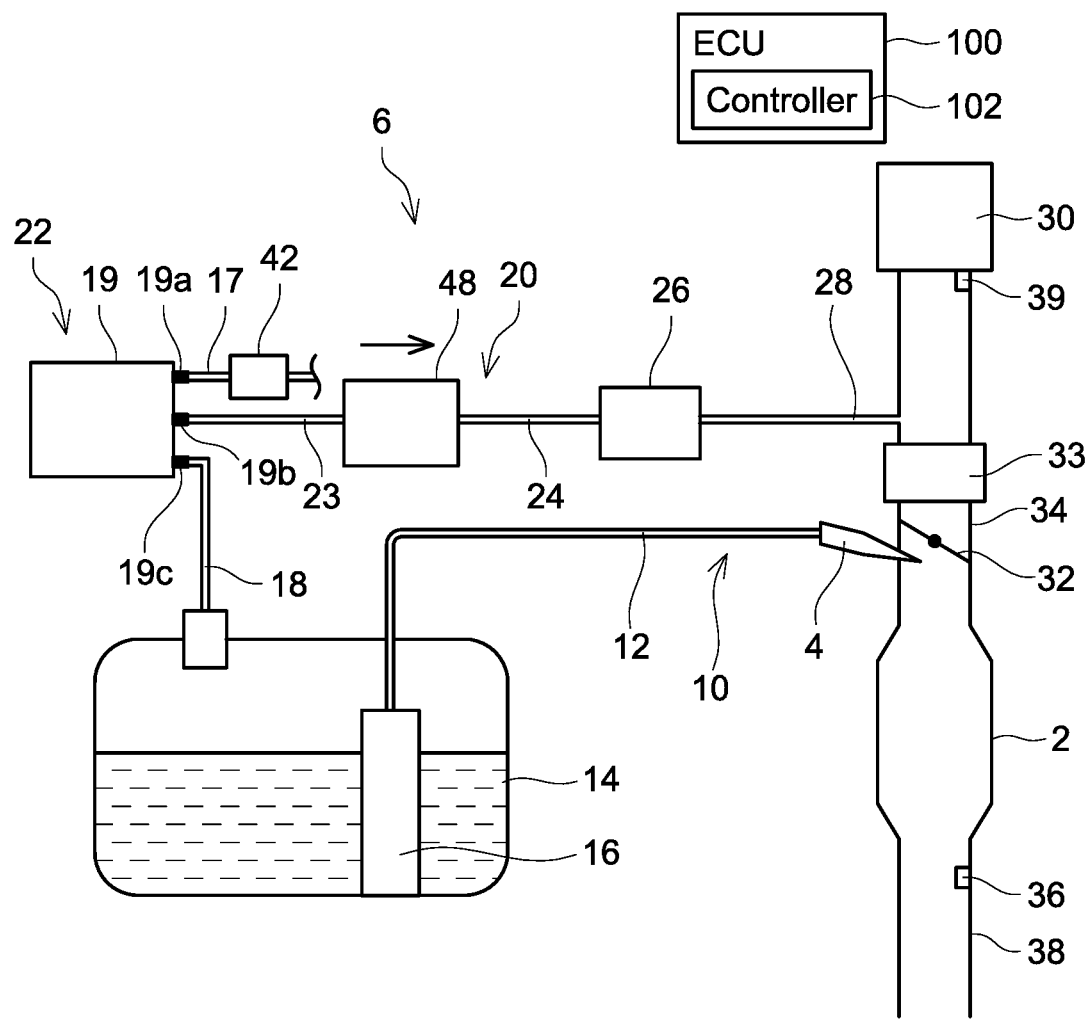
FIG. 1 shows an overview of a fuel supply system of an automobile.

A fuel supply system 6 provided with an evaporated fuel processing device 20 will be described with reference to FIG. 1. The fuel supply system 6 is mounted on a vehicle such as an automobile and so on, and provided with a main supply passage 10 for supplying fuel stored in a fuel tank 14 to an engine 2 and an evaporated fuel passage 22 for supplying evaporated fuel generated in the fuel tank 14 to the engine 2.

The main supply passage 10 is provided with a fuel pump unit 16, a supply passage 12, and an injector 4. The fuel pump unit 16 is provided with a fuel pump, a pressure regulator, a control circuit, and the like. The fuel pump unit 16 controls the fuel pump according to a signal supplied from an ECU 100. The fuel pump boosts pressure of the fuel in the fuel tank 14 and discharges the same. The pressure of the fuel discharged from the fuel pump is regulated by the pressure regulator, and the fuel is supplied from the fuel pump unit 16 to the supply passage 12. The supply passage 12 is connected to the fuel pump unit 16 and the injector 4. The fuel supplied to the supply passage 12 passes through the supply passage 12 and reaches the injector 4. The injector 4 includes a valve (not shown) of which aperture is controlled by the ECU 100. When the valve of the injector 4 is opened, the fuel in the supply passage 12 is supplied to an intake passage 34 connected to the engine 2.

The intake passage 34 is connected to an air cleaner 30. The air cleaner 30 is provided with a filter for removing foreign particles from air flowing into the intake passage 34. A throttle valve 32 is provided in the intake passage 34 between the engine 2 and the air cleaner 30. When the throttle valve 32 opens, air suction is performed from the air cleaner 30 toward the engine 2. The ECU 100 adjusts an aperture of the throttle valve 32 to change an opening area of the intake passage 34 to adjust an air amount flowing into the engine 2. The throttle valve 32 is provided on an air cleaner 30 side relative to the injector 4.

A supercharger 33 is provided between the throttle valve 32 and the air cleaner 30. The supercharger 33 is a so-called turbocharger in which a turbine is rotated by exhaust gas from the engine 2 to introduce air to the engine 2.

An air flowmeter 39 is provided on the intake passage 34 between the air cleaner 30 and the supercharger 33. The air flowmeter 39 is of one of a hot-wire type, a Karman's vortex type, and a movable-plate type. The air flowmeter 39 is configured to detect an air amount introduced to the intake passage 34 from open air through the air cleaner 30.

Gas which has been combusted in the engine 2 passes through an exhaust passage 38 and is discharged therefrom. An air-fuel ratio sensor 36 is provided on the exhaust passage 38. The air-fuel ratio sensor 36 is configured to detect an air-fuel ratio in the exhaust passage 38. When acquiring the air-fuel ratio from the air-fuel ratio sensor 36, the ECU 100 estimates an air-fuel ratio of gas supplied to the engine 2.

The evaporated fuel passage 22 is arranged side by side with the main supply passage 10. The evaporated fuel passage 22 is a passage through which the evaporated fuel generated in the fuel tank 14 passes when moving from the fuel tank 14 to the intake passage 34 via a canister 19. As will be described later, the evaporated fuel is mixed with air in the canister 19. The mixed gas of the evaporated fuel and the air, which is mixed in the canister 19, is termed purge gas. The evaporated fuel passage 22 is provided with the evaporated fuel processing device 20. The evaporated fuel processing device 20 is provided with the canister 19, a control valve 26, a pump 48, and a controller 102 within the ECU 100.

The fuel tank 14 and the canister 19 are connected to each other by a tank passage 18. The canister 19 is arranged at one end of a purge passage 23 and is connected to the pump 48 via the purge passage 23. The pump 48 is connected to the control valve 26 via a purge passage 24. The control valve 26 is connected to the intake passage 34 via a purge passage 28. The purge passages 23, 24 are connected to the intake passage 34 between the air flowmeter 39 and the supercharger 33 via the control valve 26 and the purge passage 28.

The control valve 26 is arranged between the purge passage 28 and the purge passage 24. The control valve 26 is a solenoid valve controlled by the controller 102 and is controlled by the controller 102 to switch between an open state of being opened and a closed state of being closed. In the closed state, the control valve 26 is configured to close the purge passage 24 and cut off communication between the purge passage 28 and the purge passage 24. In the open state, the control valve 26 is configured to open the purge passage 24 and communicate the purge passage 28 and the purge passage 24. The controller 102 is configured to execute duty control of continuously switching the open state and the closed state of the control valve 26 according to a duty cycle determined by the air-fuel ratio and the like. The duty cycle represents a ratio of a duration of one open state relative to a total duration of one closed state and one open state which take place successively while the control valve 26 is continuously switching between the closed state and the open state during the duty control. The control valve 26 adjusts a flow rate of the purge gas to be supplied to the intake passage 34 by adjusting the duty cycle (that is, a duration of the open state).

The pump 48 is arranged between the purge passage 24 and the purge passage 23. The pump 48 is a so-called vortex pump (which may be also called cascade pump or Wesco pump) or centrifugal pump. The pump 48 is controlled by the controller 102. When the pump 48 is driven, the purge gas is suctioned from the canister 19 into the pump 48 through the purge passage 23. A pressure of the purge gas suctioned to the pump 48 is boosted in the pump 48 and the purge gas is then pumped out to the purge passage 24. The purge gas pumped to the purge passage 24 flows through the purge passage 24, the control valve 26, and the purge passage 28 and then is supplied to the intake passage 34.

The canister 19 is connected to the pump 48 via the purge passage 23. The canister 19 is provided with an open air port 19a, a purge port 19b, and a tank port 19c. The open air port 19a communicates with open air through an open air passage 17 and an air filter 42. After air has flowed through the air filter 42, the air may flow into the canister 19 from the open air port 19a through the open air passage 17. When this happens, the air filter 42 suppresses foreign particles in the air from entering the canister 19.

The purge port 19b is connected to the purge passage 23. The tank port 19c is connected to the fuel tank 14 via the tank passage 18.

Activated carbon (not shown) is accommodated in the canister 19. The activated carbon absorbs the evaporated fuel from gas flowing into the canister 19 from the fuel tank 14 through the tank passage 18 and the tank port 19c. Gas from which the evaporated fuel has been absorbed is discharged to open air through the open air port 19a and the open air passage 17. The canister 19 can suppress the evaporated fuel in the fuel tank 14 from being discharged to open air. The evaporated fuel absorbed by the activated carbon is supplied to the purge passage 23 from the purge port 19b.

The controller 102 is connected to the pump 48 and the control valve 26. The controller 102 includes a CPU and a memory such as a ROM and a RAM. The controller 102 is configured to control the pump 48 and the control valve 26. Lines connecting the ECU 100 and the respective units are omitted. The controller 102 stores a computer program for causing the controller 102 to execute a detection-process-execution determination process and a detection process which will be described later.

Next, an operation of the evaporated fuel processing device 20 will be described. When a purge condition is satisfied while the engine 2 is being driven, the controller 102 executes a purge process of supplying the purge gas to the engine 2 by executing the duty control on the control valve 26. When the purge process is executed, the purge gas is supplied in a direction indicated by a left-to-right arrow in FIG. 1. The purge condition is a condition that is satisfied when the purge process of supplying the purge gas to the engine 2 should be executed, and is a condition that is set in the controller 102 by a manufacturer in advance according to a cooling water temperature in the engine 2 and a concentration of evaporated fuel in the purge gas (hereinbelow termed "purge concentration"). The controller 102 constantly monitors whether or not the purge condition is satisfied while the engine 2 is being driven. The controller 102 controls the duty cycle of the control valve 26 based on a purge concentration and a measured value of the air flowmeter 39. Due to this, the purge gas that had been absorbed in the canister 19 is introduced to the engine 2. A purge concentration is specified by the controller 102 using the air-fuel ratio. Alternatively, a purge concentration may be specified using concentration sensors provided on the purge passages 24, 28 and the like.

In case of executing the purge process, the controller 102 supplies the purge gas to the intake passage 34 by driving the pump 48. As a result, the purge gas can be supplied even when a negative pressure in the intake passage 34 is small.

The ECU 100 is configured to control the throttle valve 32. Further, the ECU 100 is also configured to control a fuel amount injected by the injector 4. Specifically, the injected fuel amount is controlled by controlling a valve-opening duration of the injector 4. When the engine 2 is driven, the ECU 100 calculates a fuel injection duration during which injection from the injector 4 to the engine 2 is executed (that is, the valve-opening duration of the injector 4) per unit time. The fuel injection duration corrects a reference injection duration, which has been prespecified by experiments, to maintain the air-fuel ratio at a target air-fuel ratio (such as an ideal air-fuel ratio). Further, the ECU 100 corrects the injected fuel amount based on the flow rate of purge gas and the purge concentration.

(Detection Process)

In a case where the purge passage 28 and the intake passage 34 are not suitably communicating with each other and/or in a case where at least one of the purge passages 23, 24, and 28 is damaged or clogged, the purge gas cannot be supplied normally from the purge passage 28 to the intake passage 34 even when the control valve 26 is switched to the open state. By detecting a state where the purge gas cannot be supplied normally from the purge passage 28 to the intake passage 34, the evaporated fuel processing device 20 can suppress the purge gas from leaking to open air due to the purge process being executed in the situation where the purge gas cannot be supplied normally from the purge passage 28 to the intake passage 34.

When an ignition switch is switched from off to on and the vehicle is started, the controller 102 executes the detection-process-execution determination process. In the detection-process-execution determination process, a determination is made on whether to start or prohibit the detection process of detecting the state where the purge gas cannot be supplied normally from the purge passage 28 to the intake passage 34. The detection-process-execution determination process is executed every predetermined period (such as 16 ms) while the ignition switch is on.

The detection-process-execution determination process which the controller 102 executes will be described with reference to FIG. 2. The controller 102 stores a stability flag and a prohibition flag. At the timing when the ignition switch is switched from off to on, both the stability flag and the prohibition flag are off.

In the detection-process-execution determination process, firstly in S12, the controller 102 determines whether or not the stability flag is on and whether or not a duration in which the stability flag is on is equal to or longer than a first predetermined period (such as 1000 ms). Specifically, while the ignition switch is on, the controller 102 monitors for a stable state in which the air amount flowing from open air into the intake passage 34 through the air cleaner 30 is stable. The controller 102 determines that the vehicle is in the stable state in a case where the vehicle is in an idling state or in a case where the vehicle is decelerating and thus the fuel supply to the engine 2 is stopped (that is, a decelerating fuel-cut state). In a case of determining that the vehicle is in the stable state, the controller 102 changes the stability flag from off to on.

In a case of determining that the stability flag is off or in a case of determining the duration during which the stability flag is on is less than the first predetermined period (NO in S12), the controller 102 determines in S14 whether or not the prohibition flag is off. In a case where the prohibition flag is off (YES in S14), the controller 102 switches the prohibition flag from off to on in S16 and proceeds to S18. On the other hand, in a case where the prohibition flag is on (NO in S14), the controller 102 skips S16 and proceeds to S18.

In S18, the controller 102 determines whether or not the duty cycle of the control valve 26 has been set to 0% or 100% in a process of S30 or S34 which will be described later. In a case where the duty cycle has been set to 0% or 100% (YES in S18), the controller 102 unsets the duty cycle in S20 and terminates the detection-process-execution determination process. On the other hand, in a case where the duty cycle has not been set to 0% or 100% (NO in S18), the controller 102 skips S20 and terminates the detection-process-execution determination process. The processes of S18 and S20 are processes for unsetting the duty cycle in a case where the duty cycle has been fixed in the processes of S30 or S34 which will be described later.

On the other hand, in a case where the duration during which the stability flag is on is equal to or longer than the first predetermined period in S12 (YES in S12), the controller 102 drives the pump at a predetermined rotational speed (such as 10000 rpm) in S22. Then, in S24, the controller 102 determines whether or not a detection starting condition is satisfied. The detection starting condition is satisfied when all of the following (1) to (3) are satisfied: (1) the purge concentration is equal to or less than a reference concentration (such as 5%); (2) a predetermined period (such as 1000 ms) has elapsed since a gear was shifted in the vehicle; and (3) a predetermined period (such as 1000 ms) has elapsed since an air conditioner switch was switched between on and off. A rotational speed of the engine 2 changes in a case where a gear is shifted in the vehicle and/or in a case where the air conditioner switch is switched between on and off. Due to this, it is highly possible that the air amount introduced to the intake passage 34 greatly changes until a predetermined period (such as 1000 ms) elapses, in the case where a gear is shifted in the vehicle and/or in the case where the air conditioner switch is switched between on and off. That is, each of a state that takes place from when a gear was shifted in the vehicle until the predetermined period elapses and a state that takes place from when the air conditioner switch was switched between on and off until the predetermined period elapses can be said as "change state".

In a case where the detection starting condition is not satisfied (NO in S24), the controller 102 proceeds to S14. On the other hand, in a case where the detection starting condition is satisfied (YES in S24), the controller 102 sets the prohibition flag to off in S25. Here, S25 is skipped in a case where the prohibition flag is already set to off in S24. Then, in S26, the controller 102 determines whether or not a duration in which the detection starting condition is satisfied is less than a second predetermined period (such as 500 ms). In a case where the duration is equal to or longer than the second predetermined period (NO in S26), the controller 102 determines in S28 whether or not the duty cycle of the control valve 26 is set at 0%. In a case where the duty cycle is not set at 0% (NO in S28), the controller 102 sets the duty cycle to 0% in S30 and terminates the detection-process-execution determination process. On the other hand, in a case where the duty cycle is set at 0% (YES to S28), the controller 102 skips S30 and terminates the detection-process-execution determination process.

On the other hand, in a case where the duration is less than the second predetermined period (YES in S26), the controller 102 determines in S32 whether or not the duty cycle of the control valve 26 is set at 100%. In a case where the duty cycle is not set at 100% (NO in S32), the controller 102 sets the duty cycle to 100% in S34. Due to this, the purge gas is supplied to the intake passage 34. As a result, an air amount introduced from open air through the air cleaner 30 is reduced. Then, in S36, the controller 102 starts the detection process and terminates the detection-process-execution determination process. On the other hand, in a case where the duty cycle is set at 100% (YES in S32), the controller 102 skips S34 and S36 and terminates the detection-process-execution determination process.

The detection process started in S36 will be described with reference to FIG. 3. The detection process is executed by the controller 102. When the detection process is started, firstly in S42, the controller 102 determines whether or not the prohibition flag is on. In a case where the prohibition flag is on (YES in S42), it waits until the prohibition flag is switched from on to off. Due to this, it can be avoided that the state where the purge gas cannot be supplied normally from the purge passage 28 to the intake passage 34 is detected by using an air amount detected under the situation in which the air amount flowing into the intake passage 34 from open air through the air cleaner 30 could change. On the other hand, in a case where prohibition flag is off (NO in S42), the controller 102 acquires in S44 an air amount detected by the air flowmeter 39.

Next, in S46, the controller 102 determines whether or not the duty cycle of the control valve 26 has switched from 100% to 0%. In a case where the duty cycle has not switched from 100% to 0% (NO in S46), the controller 102 returns to S42. In a case where the duty cycle has switched from 100% to 0% (YES in S46), it proceeds to S48. As above, an air amount is detected in S44 plural times while the duty cycle is 100%.

In a variant, by taking into account that a change in the air amount may delay relative to the switch of the duty cycle of the control valve 26, the controller 102 may detect an air amount over a predetermined period after the duty cycle has switched from 100% to 0%.

In S48, the controller 102 determines whether or not a difference between a maximum value and a minimum value of the air amounts detected by the plural executions of S44 is equal to or greater than a reference value. In a case where the difference is equal to or greater than the reference value (YES in S48), the controller 102 terminates the detection process. On the other hand, in a case where the difference is less than the reference value (NO in S48), the controller 102 determines in S50 that the state where the purge gas cannot be supplied normally from the purge passage 28 to the intake passage 34 is occurring, and sends to an output device of the vehicle a signal indicating that the state where the purge gas cannot be supplied normally from the purge passage 28 to the intake passage 34 is occurring. When receiving the signal, the output device outputs a display or sound indicating that the state where the purge gas cannot be supplied normally from the purge passage 28 to the intake passage 34 is occurring, and then the detection process is terminated.

When terminating the detection process, the controller 102 sets the prohibition flag to off, sets the rotational speed of the pump 48 to be changeable from the predetermined rotational speed, and unsets the duty cycle from 0%.

Figure 4:
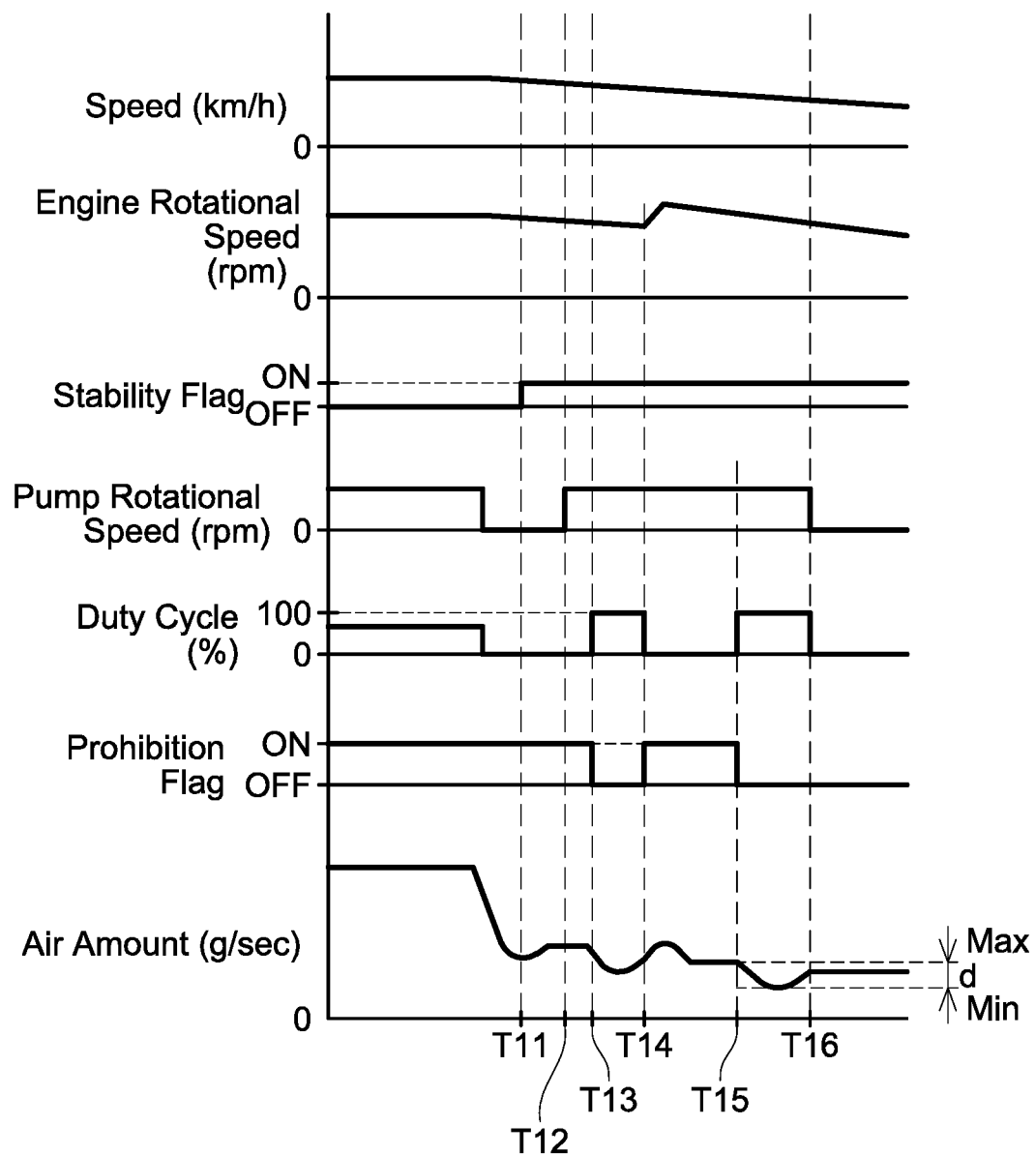
FIG. 4 shows a time chart for decelerating fuel-cut (that is, a stable state) of the first embodiment.

Next, specific cases of the detection process executed in the stable states will be described with reference to FIGS. 4 and 5. FIG. 4 shows a time chart of the vehicle speed, the rotational speed of the engine 2, the switch of the stability flag, the rotational speed of the pump 48, the duty cycle of the control valve 26, the switch of the prohibition flag, and the air amounts detected by the air flowmeter 39 in the decelerating fuel-cut state where the vehicle is decelerating and the fuel supply is stopped. Whether the prohibition flag is on or off at time T11 depends on whether or not the detection-process-execution determination process has already been executed.

When the vehicle decelerates and the fuel supply from the injector 4 is stopped at time T11, the stable state is maintained and the stability flag is switched from off to on. At time T12 when the first predetermined period has elapsed from time T11 (YES in S12), the pump 48 is driven at the predetermined rotational speed (S22). Then, when the detection starting condition is satisfied at time T13 (YES in S24), the prohibition flag is set to off (S25) and the duty cycle of the control valve 26 is set to 100% (S34). Due to this, the detection process is started (S36).

Next, when the transmission is shifted at time T14 during execution of the detection process, the rotational speed of the engine 2 changes. Due to this, the change state in which the air amount detected by the air flowmeter 39 suddenly changes occurs. In this case, the detection starting condition is not satisfied (NO in S24), the prohibition flag is switched from off to on (S16), and the duty cycle is unset (S20). Due to this, in the case where the change state in which the change in the air amount introduced to the intake passage 34 is large occurs while the detection process is executed, that is, while an air amount is repeatedly acquired (S44) (in other words, while the duty cycle of the control valve 26 is maintained at 100%), the detection process is prohibited until the predetermined period elapses since the occurrence of the change state. The air amount introduced from open air to the intake passage 34 may not be stable immediately after the change state has occurred. According to this configuration, execution of the detection process can be suppressed in such a situation where the air amount introduced from open air to the intake passage 34 is not stable. At this occasion, even if the stability flag is on, the acquisition of the air amount is prohibited if the prohibition flag is on.

At time T15 when the predetermined period has elapsed since the gear-shifting, the detection starting condition is satisfied (YES in S24) and the prohibition flag is set from on to off (S25). Further, since the duration during which the detection starting condition is satisfied is shorter than the second predetermined period (YES in S26), the duty cycle is set to 100% (S34). Due to this, an air amount is repeatedly detected in the air flowmeter 39 in the detection process. The air amount in the air flowmeter 39, that is, the air amount introduced from open air to the intake passage 34 through the air cleaner 30 changes depending on a purge gas amount. At time T16 when the second predetermined period has elapsed since the detection starting condition was satisfied (YES in S26), the duty cycle is set to 0% (YES in S30, S46). Due to this, the duty cycle can be suppressed from being maintained at 100% over a long period of time and the detection process can be suppressed from continuing. Due to this, excessive supply of the purge gas to the intake passage 34 can be suppressed. The state where the purge gas cannot be supplied normally from the purge passage 28 to the intake passage 34 is detected based on whether or not the difference between the maximum value and the minimum value of the air amounts detected by the air flowmeter 39 from time T15 to time T16 is equal to or greater than the reference value (S48).

Figure 5:
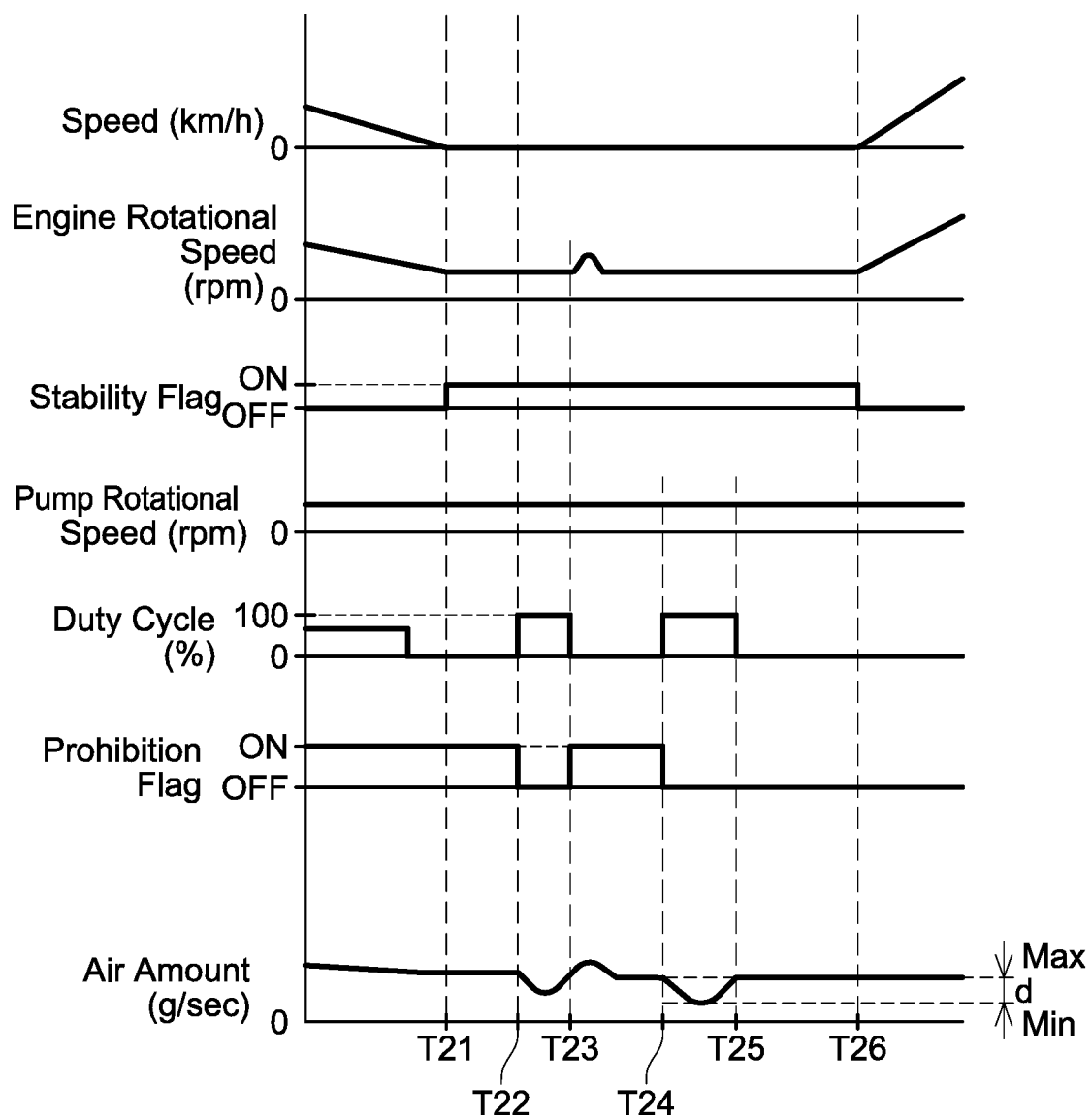
FIG. 5 shows a time chart for idling (that is, a stable state) of the first embodiment.

Next, FIG. 5 shows a time chart of the vehicle speed, the rotational speed of the engine 2, the switch of the stability flag, the rotational speed of the pump 48, the duty cycle of the control valve 26, the switch of the prohibition flag, and the air amounts detected by the air flowmeter 39 during so-called idling where the vehicle is stopped and the engine 2 is driving at a constant rotational speed. When the idling is started at time T21, the rotational speed of the engine 2 is maintained constant. At time T21, the stability flag is switched from off to on.

At time T22 when the first predetermined period has elapsed from time T21 (YES in S12), the pump 48 is driven at the predetermined rotational speed (S22). Since the pump 48 is driven at the predetermined rotational speed during the idling, the rotational speed of the pump 48 does not change during the idling. Then, when the detection starting condition is satisfied at time T22 (YES in S24), the prohibition flag is set to off (S25) and the duty cycle of the control valve 26 is set to 100% (S34). Due to this, the detection process is started (S36).

When the air conditioner is operated at time T23, the rotational speed of the engine 2 increases. Due to this, the change state in which the air amount detected in the air flowmeter 39 suddenly changes occurs. In this case, the detection starting condition is not satisfied (NO in S24), the prohibition flag is switched from off to on (S16), and the duty cycle is unset (S20). Due to this, the acquisition of the air amount by the controller 102 can be suppressed immediately after the change state has occurred.

At time T24 when the predetermined period has elapsed from the operation of the air conditioner, the detection starting condition is satisfied (YES in S24) and the prohibition flag is set from on to off (S25). Further, since the duration in which the detection starting condition is satisfied is less than the second predetermined period (YES in S26), the duty cycle is set to 100% (S34). Due to this, an air amount is repeatedly detected in the air flowmeter 39 in the detection process. At time T25 when the second predetermined period has elapsed since the detection starting condition was satisfied (YES in S26), the duty cycle is set to 0% (S30, YES in S46). Due to this, the duty cycle can be suppressed from being maintained at 100% over a long period of time and the detection process can be suppressed from continuing. Due to this, supply of a large amount of the purge gas to the intake passage 34 can be suppressed. When the idling ends at time T26, the stability flag is switched to off.

In the detection process, the purge gas can be pumped by the pump 48. Thus, in the state where the purge gas can be supplied normally from the purge passage 28 to the intake passage 34, the purge gas is suitably supplied to the intake passage 34. On the other hand, in the state where the purge gas cannot be supplied normally from the purge passage 28 to the intake passage 34, the purge gas is not suitably introduced to the intake passage 34 even when the purge gas is pressurized by the pump 48. Due to this, the air amount introduced to the intake passage 34 changes greatly in the state where the purge gas can be supplied normally from the purge passage 28 to the intake passage 34, whereas the air amount introduced to the intake passage 34 hardly changes in the state where the purge gas cannot be supplied normally from the purge passage 28 to the intake passage 34. Therefore, the state where the purge gas cannot be supplied normally from the purge passage 28 to the intake passage 34 can be detected by using the maximum value and the minimum value of the air amounts introduced to the intake passage 34.

Further, in the detection process, the purge gas is supplied to the engine 2 through the intake passage 34. By prohibiting the detection process in the case where the purge concentration is equal to or higher than the reference concentration (NO in S24), the air-fuel ratio can be suppressed from fluctuating.

Second Embodiment

Features that differ from those of the first embodiment will be described. In the present embodiment, contents of a detection-process-execution determination process are different. The detection-process-execution determination process which the controller 102 executes will be described with reference to FIG. 6. The controller 102 stores the stability flag and the prohibition flag. At a timing when the ignition switch is switched from off to on, both the stability flag and the prohibition flag are set to off.

In the detection-process-execution determination process, firstly in S112, the controller 102 determines whether or not a duration in which the stability flag is on is equal to or longer than a third predetermined period (such as 1000 ms) and whether or not the purge concentration is equal to or less than the reference concentration (such as 5%). When the ignition switch of the vehicle is switched from off to on, the controller 102 determines whether or not the vehicle is in the stable state. The stable state is a state in which the engine 2 is stopped and further either one of the following state (1) or (2) is occurring: (1) a state in which the ignition switch is on, or (2) a state immediately after the ignition switch has been switched from on to off. The state (1) above is, for example, a state in which idling is stopped while the vehicle is stopped or a state in which the engine 2 is stopped while a hybrid vehicle is decelerating. In a case where the aforementioned conditions are satisfied, the controller 102 maintains the stability flag on. In the stable state, the engine 2 is stopped, thus air is not introduced from open air through the air cleaner 30. This can be also said as that "the air amount introduced from open air to the intake passage is stable".

In a case of determining that the duration in which the stability flag is off or on is less than the third predetermined period, or in a case where the purge concentration is higher than the reference concentration (NO in S112), the controller 102 executes the processes of S14 to S20 and terminates the detection-process-execution determination process. On the other hand, in a case of determining that the duration in which the stability flag is on is equal to or longer than the third predetermined period and that the purge concentration is equal to or less than the reference concentration (YES in S112), the controller 102 executes the process of S22, then causes the ECU 100 to close the throttle valve 32 in S114, and proceeds to S118. Due to this, communication between the intake passage 34 on a downstream side relative to the throttle valve 32 and open air is cut off. In a case where the throttle valve 32 is maintained in a fully-closed state, the controller 102 skips S114 and proceeds to S118.

In S118, the controller 102 determines whether or not the duration in which the stability flag is on (that is, the duration in which the engine 2 is stopped) is equal to or longer than a fourth predetermined period and whether or not the purge concentration is equal to or less than the reference concentration. In a case of determining that the duration in which the stability flag is on is less than the fourth predetermined period or in a case of determining that the purge concentration is higher than the reference concentration (NO in S118), the controller 102 cancels the fully-closed state of the throttle valve 32 in S120 and proceeds to S14.

On the other hand, in a case of determining that the duration in which the stability flag is on is equal to or longer than the fourth predetermined period and that the purge concentration is equal to or less than the reference concentration (YES in S118), the controller 102 executes the process of S25 and then determines in S122 whether or not the duration in which the stability flag is on is less than a fifth predetermined period and whether or not the purge concentration is equal to or less than the reference concentration. In a case of determining that the duration is less than the fifth predetermined period and that the purge concentration is equal to or less than the reference concentration (YES in S122), the controller 102 executes the processes of S32 to S36 and terminates the detection-process-execution determination process. In the present embodiment, the purge gas is supplied to the intake passage 34 when the duty cycle is set to 100%. At this occasion, since the throttle valve 32 is closed, air is not introduced from open air through the air cleaner 30. On the other hand, the purge gas supplied to the intake passage 34 flows in the intake passage 34 toward the air cleaner 30. As a result, the air flowmeter 39 detects a purge gas amount supplied to the intake passage 34. On the other hand, in a case of determining that the duration is equal to or longer than the fifth predetermined period or that the purge concentration is greater than the reference concentration (NO in S122), the controller 102 executes the processes of S28 to S30 and terminates the detection-process-execution determination process.

Figure 7:
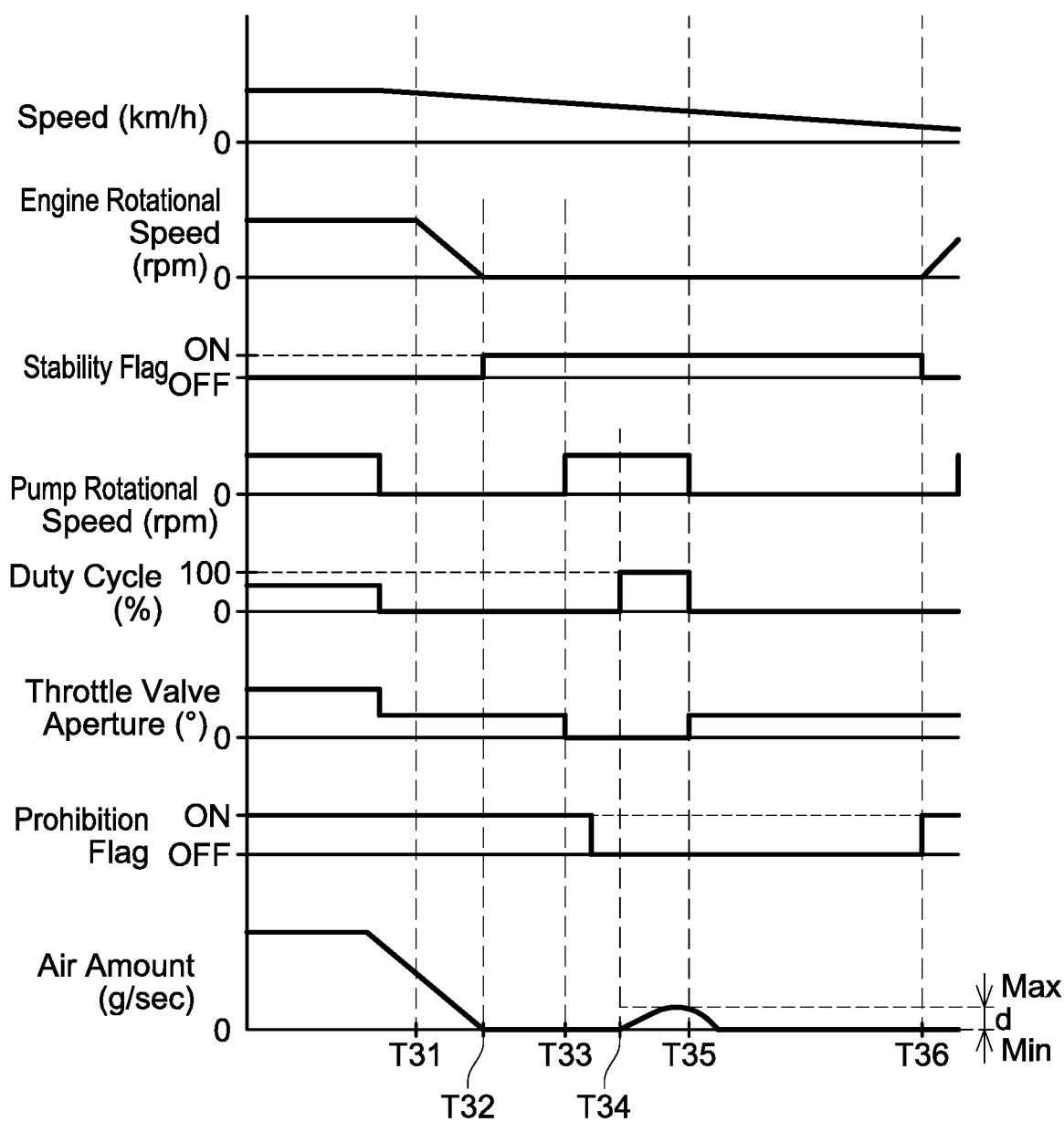
FIG. 7 shows a time chart for an engine being stopped (that is, a stable state) of the second embodiment.

Next, FIG. 7 shows a time chart of the vehicle speed, the rotational speed of the engine 2, the switch of the stability flag, the rotational speed of the pump 48, the duty cycle of the control valve 26, the aperture of the throttle valve 32, the switch of the prohibition flag, and the air amounts detected by the air flowmeter 39 in the state where the vehicle decelerates and the engine 2 is stopped. When the vehicle decelerates, the rotational speed of the engine 2 decreases at time T31. Then, the engine 2 is completely stopped at time T32. At this occasion, the stability flag is switched from off to on. Due to this, air supply from open air to the intake passage 34 becomes zero, thus the air amount detected by the air flowmeter 39 becomes 0 g/sec.

At time T33 when the third predetermined period has elapsed since the stability flag was set to on (that is, since the engine 2 was stopped), the pump 48 is driven at the predetermined rotational speed (S22) and the throttle valve 32 is shifted to the fully-closed state (S114). In a case where the duration in which the stability flag is on is equal to or longer than the fourth predetermined period and the purge concentration is equal to or less than the reference concentration (YES in S118) in a period from time T33 to time T34, the prohibition flag is set to off (S25). In a case where the duration in which the stability flag is on is equal to or less than the fifth predetermined period and the purge concentration is equal to or less than the reference concentration (YES in S122) at time T34, the duty cycle of the control valve 26 is set to 100% (S34). Due to this, the detection process is started (S36). Thus, the purge gas flows into the intake passage 34 and a gas amount (which is actually the purge gas amount) detected by the air flowmeter 39 changes suddenly. In the detection process, a purge gas amount is repeatedly detected in the air flowmeter 39.

At time T35, the duty cycle is set to 0% (S30, YES in S46). At time T36, the engine 2 is driven, the stability flag is switched from on to off, and the prohibition flag is switched from off to on (S16).

Figure 8:
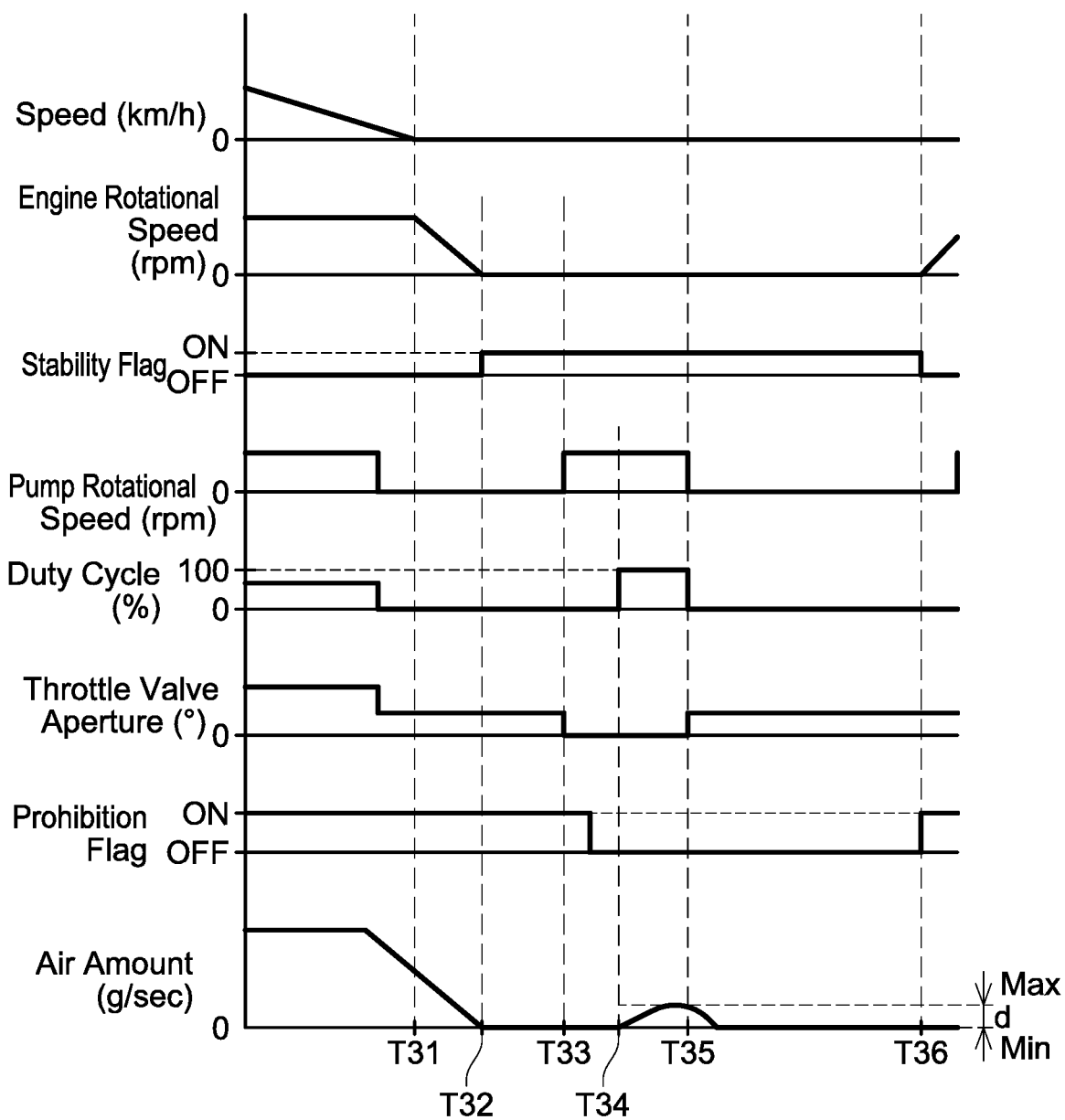
FIG. 8 shows a time chart for idling stop (that is, a stable state) of the second embodiment.

As shown in FIG. 8, in a case where idling is stopped while the vehicle is stopped as well, the similar processes are executed except for the vehicle speed.

Figure 9:
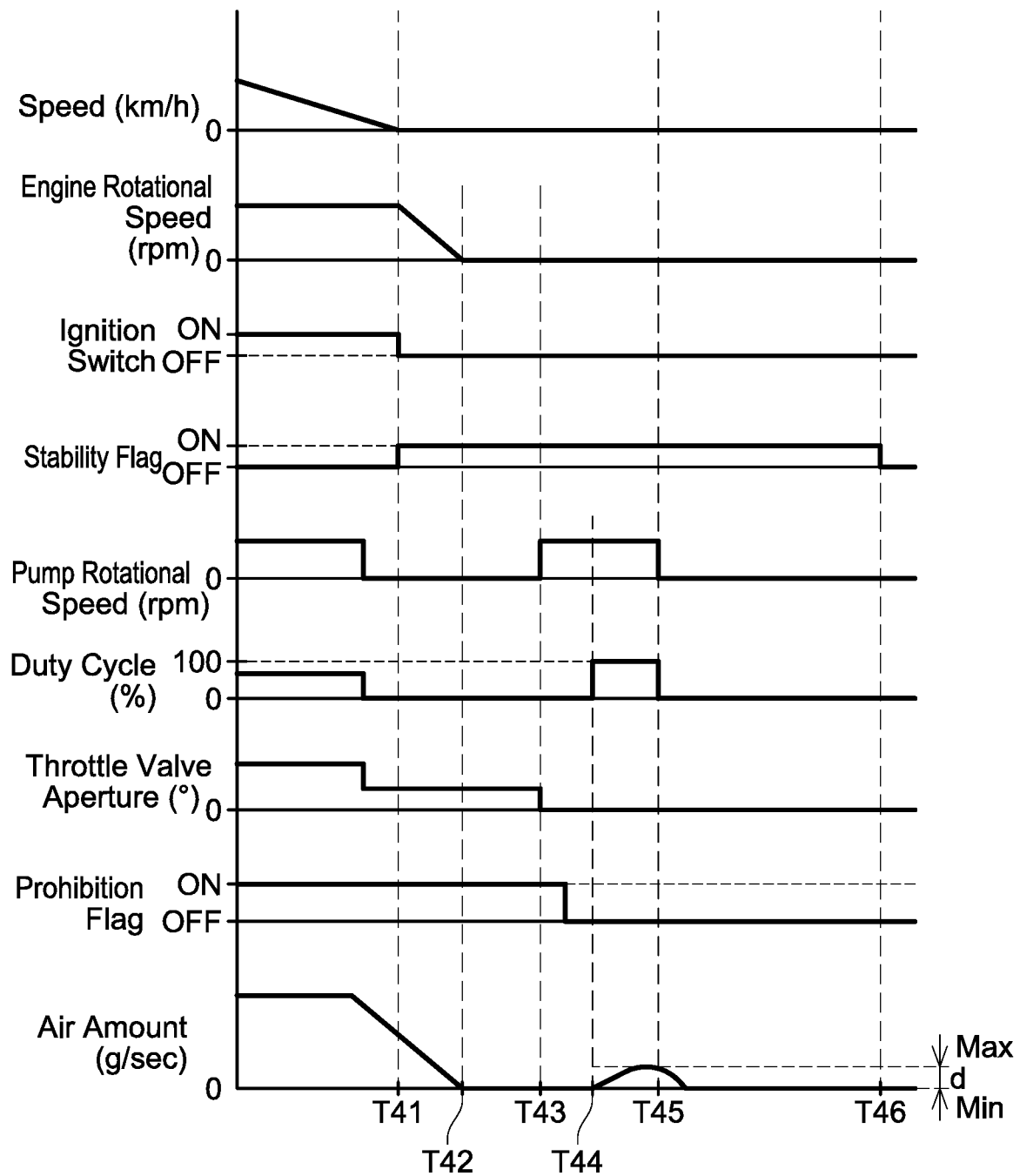
FIG. 9 shows a time chart when an ignition switch is switched from on to off (that is, a stable state) of the second embodiment.

FIG. 9 shows a time chart of the vehicle speed, the rotational speed of the engine 2, the switch of the stability flag, the rotational speed of the pump 48, the duty cycle of the control valve 26, the aperture of the throttle valve 32, and the air amounts detected by the air flowmeter 39 at a time immediately after the ignition switch had been switched from on to off. When the vehicle decelerates and then the ignition switch is switched from on to off at time T41, the rotational speed of the engine 2 decreases. Then, the engine 2 is completely stopped at time T42. At this occasion, the stability flag is switched from off to on. The air supply from open air to the intake passage 34 becomes zero, and the air amount detected by the air flowmeter 39 becomes 0 g/sec. At the timing when the ignition switch is switched from on to off, a power source system of the vehicle and the ECU 100 are still operating.

At time T43 when the third predetermined period has elapsed since the stability flag was set to on, the pump 48 is driven at the predetermined rotational speed (S22) and the throttle valve 32 is shifted to the fully-closed state (S114). In a case where the duration in which the stability flag is on is equal to or longer than the fourth predetermined period and the purge concentration is equal to or less than the reference concentration (YES in S118) in a period from time T43 to time T44, the prohibition flag is set to off (S25). In a case where the duration in which the stability flag is on is equal to or less than the fifth predetermined period and the purge concentration is equal to or less than the reference concentration (YES in S122) at time T44, the duty cycle of the control valve 26 is set to 100% (S34). Due to this, the detection process is started (S36). Thus, the purge gas flows into the intake passage 34 and a purge gas amount detected by the air flowmeter 39 changes suddenly. In the detection process, a purge gas amount is repeatedly detected in the air flowmeter 39.

At time T45, the duty cycle is set to 0% (S30, YES in S46). At time T46, the power source of the vehicle and the ECU 100 are stopped.

According to the detection process of the second embodiment as well, the air amount introduced to the intake passage 34 changes greatly in the state where the purge gas can be supplied normally from the purge passage 28 to the intake passage 34, whereas the air amount introduced to the intake passage 34 hardly changes in the state where the purge gas cannot be supplied normally from the purge passage 28 to the intake passage 34, similar to the first embodiment. Due to this, the state where the purge gas cannot be supplied normally from the purge passage 28 to the intake passage 34 can be detected by using the maximum value and the minimum value of the purge gas amounts introduced to the intake passage 34.

In the detection process of the second embodiment, the state where the purge gas cannot be supplied normally from the purge passage 28 to the intake passage 34 may be detected by using the maximum value of the air amounts detected by the air flowmeter 39 (which is actually the maximum value of the purge gas amounts) while the duty cycle is 100%.

Specific examples of the present disclosure have been described in detail, however, these are mere exemplary indications and thus do not limit the scope of the claims. The art described in the claims include modifications and variations of the specific examples presented above.

(1) In the embodiments described above, the purge passage 28 is connected to the intake passage 34 on the downstream side relative to the throttle valve 32, however, in addition thereto or as an alternative thereto, the purge passage 28 may be connected to the intake passage 34 on an upstream side relative to the throttle valve 32. For example, in a case where a supercharger is provided on the upstream side relative to the throttle valve 32, the purge passage 28 on the upstream side relative to the throttle valve 32 may be connected to the intake passage 34 on the upstream side relative to the supercharger.

(2) The controller 102 may be configured separately from the ECU 100.

Figure 2:
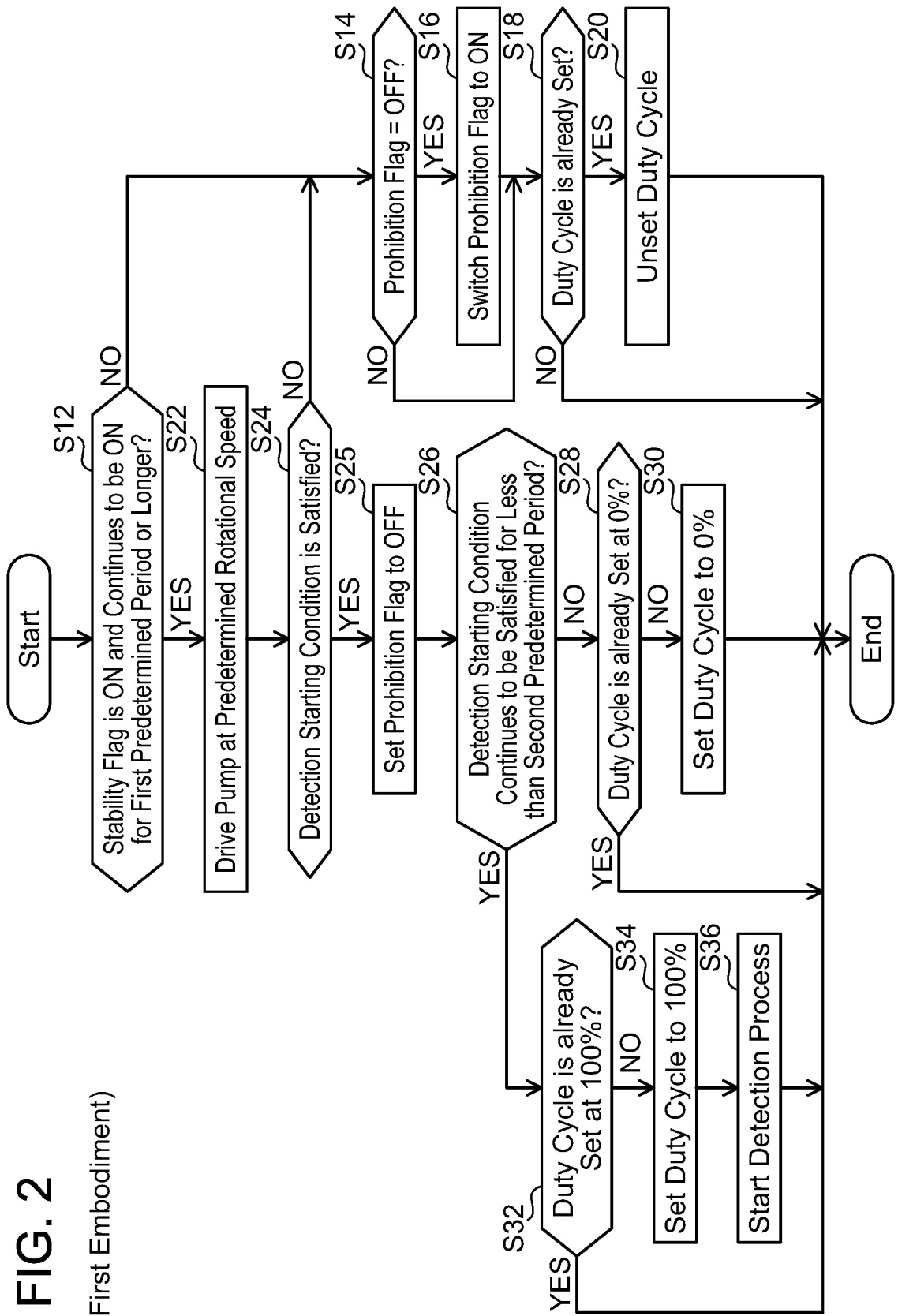
FIG. 2 shows a flowchart of a detection-process-execution determination process of a first embodiment.
Figure 3:
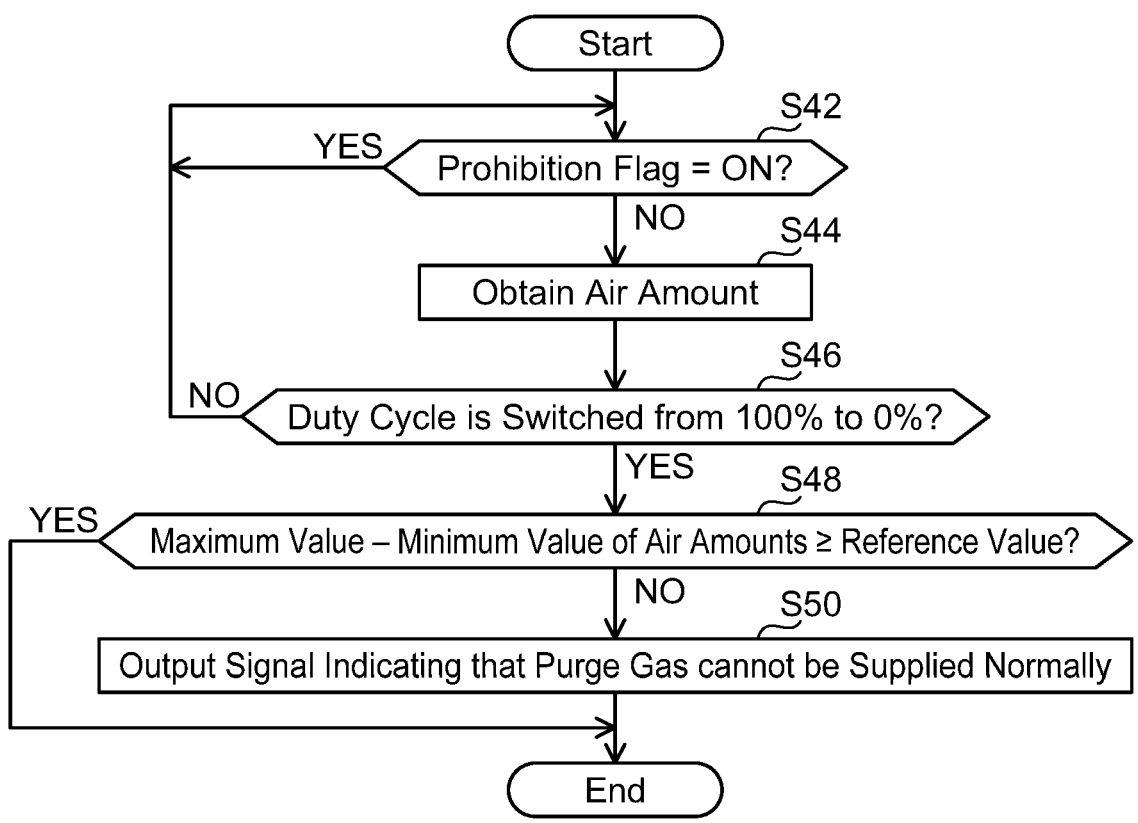
FIG. 3 shows a flowchart of a detection process of the first embodiment.
Figure 6:
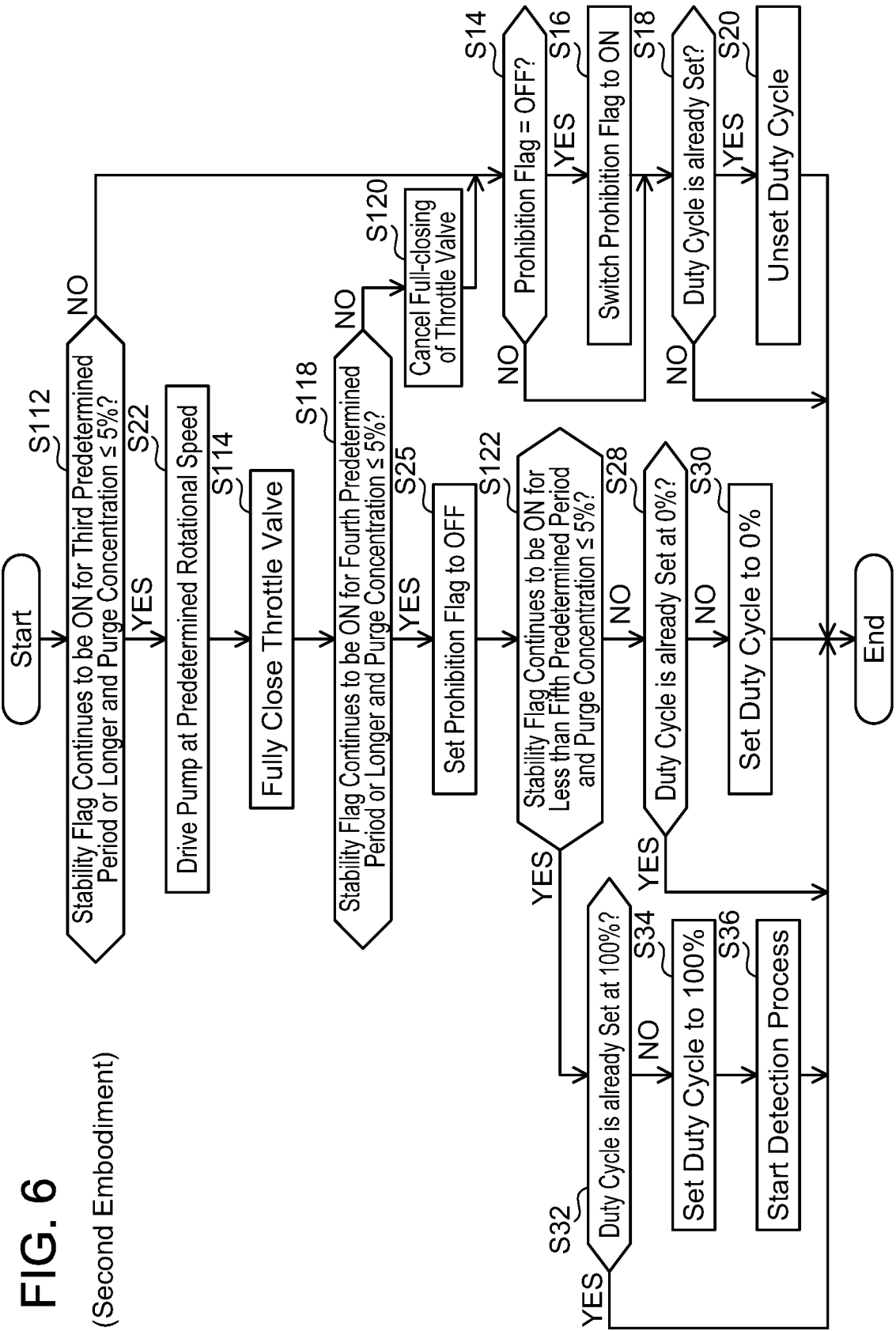
FIG. 6 shows a flowchart of a detection-process-execution determination process of a second embodiment.

(3) Process orders of the detection-process-execution determination processes in FIGS. 2, 6 and the detection process of FIG. 3 may suitably be changed. Further, for example, in the detection-process-execution determination process of FIG. 2, the detection process may be started in a case where the stability flag is on in S12. In this case, the rotational speed of the pump 48 may not be the predetermined rotational speed. For example, in a case where the pump 48 is already being driven, the detection process may be executed at a rotational speed at which the pump 48 is being driven. In this case, the reference value used in the detection process may be changed according to the rotational speed of the pump 48. Alternatively, the duty cycle may not be set to 100% in the detection process. In this case, the reference value used in the detection process may be changed according to the duty cycle.

(4) In the present embodiments, the detection process is started in the case where the stability flag is on continuously over the first predetermined period or the third predetermined period (S12 of FIG. 2, S112 of FIG. 6). However, the detection process may be started immediately when the stability flag is switched to on, that is, when the stable state occurs.

(5) In the present embodiments, the state where the purge gas cannot be supplied normally from the purge passage 28 to the intake passage 34 is determined by executing the detection process once. However, the state where the purge gas cannot be supplied normally from the purge passage 28 to the intake passage 34 may be determined by using results obtained by executing the detection process plural times. Due to this, false detection caused by detection errors and/or defective detection can be suppressed.

(6) The supercharger 33 may not be provided on the intake passage 34.

(7) In the present embodiments, the pump 48 is disposed between the purge passage 23 and the purge passage 24. However, a position of the pump 48 is not limited thereto, and may be disposed on the open air passage 17, for example.

The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

The invention claimed is:

1. An evaporated fuel processing device, comprising:
a pump configured to supply purge gas, which includes evaporated fuel in a fuel tank, to an intake passage of an engine through a purge passage;
a controller configured to control the pump; and
a detecting unit configured to acquire a gas amount introduced to the intake passage while the pump is being driven in a stable state where an air amount introduced from open air to the intake passage is stable, and configured to detect, by using change in the acquired gas amount, a state where the purge gas is unable to be normally supplied from the purge passage to the intake passage, wherein in a case where a change state where the air amount introduced to the intake passage greatly changes occurs while acquisition of the gas amount is executed, the detecting unit prohibits the acquisition of the gas amount until a predetermined period elapses from the change state.

2. An evaporated fuel processing device, comprising:
a pump configured to supply purge gas, which includes evaporated fuel in a fuel tank, to an intake passage of an engine through a purge passage;
a controller configured to control the pump; and
a detecting unit configured to acquire a gas amount introduced to the intake passage while the pump is being driven in a stable state where an air amount introduced from open air to the intake passage is stable, and configured to detect, by using change in the acquired gas amount, a state where the purge gas is unable to be normally supplied from the purge passage to the intake passage, wherein
the detecting unit prohibits acquisition of the gas amount in a case where a concentration of the evaporated fuel of the purge gas is equal to or higher than a reference concentration.

3. An evaporated fuel processing device, comprising:
a pump configured to supply purge gas, which includes evaporated fuel in a fuel tank, to an intake passage of an engine through a purge passage;
a controller configured to control the pump; and
a detecting unit configured to acquire a gas amount introduced to the intake passage while the pump is being driven in a stable state where an air amount introduced from open air to the intake passage is stable, and configured to detect, by using change in the acquired gas amount, a state where the purge gas is unable to be normally supplied from the purge passage to the intake passage wherein
the stable state includes at least one state of a state where the engine is stopped, an idling state, and a decelerating state.

4. An evaporated fuel processing device, comprising:
a pump configured to supply purge gas, which includes evaporated fuel in a fuel tank, to an intake passage of an engine through a purge passage;
a controller configured to control the pump; and
a detecting unit configured to acquire a gas amount introduced to the intake passage while the pump is being driven in a stable state where an air amount introduced from open air to the intake passage is stable, and configured to detect, by using change in the acquired gas amount, a state where the purge gas is unable to be normally supplied from the purge passage to the intake passage wherein
the detecting unit stops acquisition of the gas amount in a case where a duration of the acquisition of the gas amount exceeds a predetermined period.

5. The evaporated fuel processing device as in claim 4, further comprising:
a control valve configured to switch between a state of opening the purge passage and a state of closing the purge passage,
wherein the control valve is maintained in the state of opening the purge passage while the gas amount is acquired, and
the control valve switches from the state of opening the purge passage to the state of closing the purge passage in a case where the duration of the acquisition of the gas amount exceeds the predetermined period.

* * * * *